US009627925B2

(12) United States Patent
Chandler et al.

(10) Patent No.: US 9,627,925 B2
(45) Date of Patent: Apr. 18, 2017

(54) METHODS AND APPARATUS FOR MANAGING AND UTILIZING HARVESTED ENERGY

(71) Applicant: Walter Kidde Portable Equipment, Inc., Mebane, NC (US)

(72) Inventors: Bill Chandler, Woodland Park, CO (US); Anis Zribi, Colorado Springs, CO (US)

(73) Assignee: WALTER KIDDE PORTABLE EQUIPMENT, INC., Mebane, NC (US)

( * ) Notice: Subject to any disclaimer, the term of this patent is extended or adjusted under 35 U.S.C. 154(b) by 638 days.

(21) Appl. No.: 14/138,360

(22) Filed: Dec. 23, 2013

(65) Prior Publication Data

US 2014/0183947 A1    Jul. 3, 2014

Related U.S. Application Data

(60) Provisional application No. 61/747,096, filed on Dec. 28, 2012.

(51) Int. Cl.
*H02J 7/00* (2006.01)
*H02J 9/00* (2006.01)
*H02J 9/06* (2006.01)
*H02J 17/00* (2006.01)

(52) U.S. Cl.
CPC .............. *H02J 9/061* (2013.01); *H02J 17/00* (2013.01); *Y10T 307/344* (2015.04); *Y10T 307/615* (2015.04)

(58) Field of Classification Search
CPC ............................. H02J 9/061; Y10T 307/625
USPC ........................................................... 307/66
See application file for complete search history.

(56) References Cited

U.S. PATENT DOCUMENTS

| | | |
|---|---|---|
| 5,587,705 A | 12/1996 | Morris |
| 5,793,184 A | 8/1998 | O'Connor |
| 6,741,174 B2 | 5/2004 | Rhoades et al. |
| 6,873,256 B2 | 3/2005 | Lemelson et al. |
| 7,049,972 B2 | 5/2006 | Fabian et al. |
| 7,268,683 B2 | 9/2007 | Andres et al. |
| 7,400,253 B2 | 7/2008 | Cohen |
| 7,427,925 B2 | 9/2008 | Barrett et al. |
| 7,786,879 B2 | 8/2010 | Lax |
| 2001/0043144 A1 | 11/2001 | Morris |
| 2006/0281435 A1* | 12/2006 | Shearer .............. G06K 19/0707 455/343.1 |
| 2007/0194906 A1 | 8/2007 | Sink |

(Continued)

*Primary Examiner* — Carlos Amaya
(74) *Attorney, Agent, or Firm* — Cantor Colburn LLP (57) ABSTRACT

An apparatus and a method are provided for managing energy harvested from one or more environmental sources and using the harvested energy to power an electronic device. An apparatus includes a primary power source and an energy harvester onboard the apparatus for converting energy from the environmental sources into harvested energy. The apparatus further includes an energy controller connected to the primary power source and the energy harvester, where the energy controller uses the harvested energy to power an electronic device onboard the apparatus. The electronic device can include a hazard detector or an access control device. The apparatus can also provide backup power using the harvested energy to power the electronic device when the primary power source fails.

18 Claims, 3 Drawing Sheets

(56) References Cited

U.S. PATENT DOCUMENTS

| | | |
|---|---|---|
| 2008/0007397 A1 | 1/2008 | Glazer |
| 2008/0295549 A1 | 12/2008 | Hsieh |
| 2010/0060231 A1* | 3/2010 | Trainor .................. H01G 11/14 320/103 |
| 2010/0097207 A1 | 4/2010 | Mildenberger et al. |
| 2012/0050051 A1 | 3/2012 | Clossen-Von Lanken Schulz |

* cited by examiner

METHODS AND APPARATUS FOR MANAGING AND UTILIZING HARVESTED ENERGY

CROSS REFERENCE TO RELATED APPLICATIONS

This application is a non-provisional patent application which claims the benefit of U.S. provisional patent application Ser. No. 61/747,096 filed Dec. 28, 2012, the entire contents of which are incorporated herein by reference.

FIELD

The present teachings relate generally to management and utilization of harvested energy, and more particularly, to platforms and techniques for managing and utilizing energy harvested from environmental sources to power electronic devices.

BACKGROUND

Hazard detection alarms are well known for detecting hazards such as fire, smoke, radiation, carbon monoxide, intruders, etc. Presently, hazard detection alarms typically use either mains power with battery backup or batteries alone. While such alarms require periodic changing of batteries, users often ignore such requirements and thus expose themselves to safety risks.

SUMMARY

The following presents a simplified summary in order to provide a basic understanding of some aspects of one or more embodiments of the present teachings. This summary is not an extensive overview, nor is it intended to identify key or critical elements of the present teachings or to delineate the scope of the disclosure. Rather, its primary purpose is merely to present one or more concepts in simplified form as a prelude to the detailed description presented later.

According to the present teachings in one or more aspects, methods and apparatus for managing and utilizing harvested energy are provided, in which the energy harvested from one or more environmental sources is used to power electronic devices. An exemplary apparatus includes at least one energy harvester onboard the apparatus for converting energy from the environmental sources into harvested energy. The apparatus further includes an energy controller connected to the energy harvester and an electronic device onboard the apparatus, wherein the energy controller uses the harvested energy to supplement and/or backup a primary power source of the apparatus in powering the electronic device. The electronic device can include a hazard detector or an access control device. The apparatus can determine whether or not a power level of the harvested energy is above a threshold. If the power level is above the threshold, the apparatus can power the electronic device using the harvested energy. If the power level of the harvested energy is above zero but not above the threshold, the apparatus can combine the harvested energy with energy from the primary power source to power the electronic device. The apparatus can also supervise the primary power source to determine whether the primary power source has failed or is unavailable to power the electronic device. If the apparatus determines that the primary power source has failed or is unavailable, the apparatus can enter a fail-safe mode and power the electronic device or critical components or functions thereof on an emergency basis using the harvested energy.

It is to be understood that both the foregoing general description and the following detailed description are exemplary and explanatory only and are not restrictive of the invention, as claimed.

DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific implementations in which the invention may be practiced. These implementations are described in sufficient detail to enable those skilled in the art to practice these implementations and it is to be understood that other implementations may be utilized and that modifications and equivalents may be made without departing from the scope of the present teachings. The following description is, therefore, merely exemplary.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Aspects of the present teachings relate to one or more energy harvesting elements onboard an apparatus that can harvest or scavenge energy from environmental sources to power an electronic device, such as a hazard detector or an access control device, in the apparatus. Due to significant reduction in power consumption of modern electronic devices, it is increasingly plausible to rely on energy harvested from the environment to power such electronic devices, either as a primary source of energy or as a backup to another source of energy such as mains power or chemical batteries. The energy harvesting elements onboard the apparatus can harvest or scavenge energy from one or more environmental sources and manage the harvested energy to supply or supplement the energy necessary to power the electronic device. Environmental sources can include ambient or background sources of energy, examples of which include electromagnetic radiation (e.g., visible light, infrared light, radio waves, etc.), magnetic field, radiation, vibration, mechanical and biomechanical movement, heat, chemical reaction, pressure, airflow, and the like. By managing and utilizing energy harvested from environmental sources, the need to replace onboard chemical batteries can be reduced or eliminated altogether.

Figure 1:
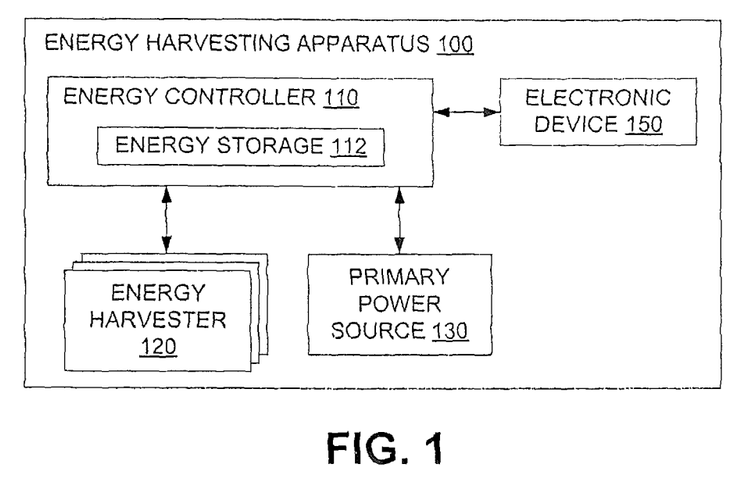
FIG. 1 illustrates an exemplary energy harvesting apparatus that incorporates onboard energy harvesting elements, consistent with various embodiments of the present teachings.

In various embodiments and as generally shown in FIG. 1, an energy harvesting apparatus 100 can include onboard energy harvesting elements, such as an energy controller 110 and at least one energy harvester 120. Energy controller 110 can receive and manage energy harvested by energy harvester 120 from one or more environmental sources, and use the harvested energy to power and/or control an electronic device 150. Energy controller 110 can manage energy harvested by energy harvester 120 by, for example, monitoring the availability of harvested energy, conditioning the harvested energy, combining the harvested energy with energy from another source to power electronic device 150, communicating with and/or powering up/down electronic device 150, and the like. Energy controller 110 can condition the harvested energy, for example, by rectifying, smoothing, stepping up, and/or stepping down the voltage of the harvested energy.

Energy controller 110 can also manage harvested energy by switching between the harvested energy and energy from another source to power electronic device 150 based on the availability of the harvested energy and power demands of electronic device 150. For example, energy controller 110 can switch to harvested energy and rely on the harvested energy to power electronic device 150 when energy controller 110 determines that a power level of the harvested energy is above a threshold. Energy controller 110 can determine the power level based on the harvested energy's potential (e.g., voltage), flow rate (e.g., amperage), and/or power (e.g., wattage). For another example, energy controller 110 can switch to a non-harvested source of power, such as chemical batteries or mains power, to power electronic device 150 when energy controller 110 determines that the current draw of electronic device 150 surpasses a threshold or would surpass a threshold, such as when electronic device 150 enters into an alarm mode or performs a self-diagnostic.

According to various embodiments, energy controller 110 can include a voltage converter, a regulating circuit, rectifiers and matching networks, a power conditioner, a power switch/combiner, and/or any other hardware or software configured to provide power continuously, periodically, or on-demand, so that electronic device 150 can operate in an always-on mode or power on periodically or on demand. Energy controller 110 can store the harvested energy in energy storage 112, and can draw energy from energy storage 112 to supplement or provide the energy needed to power electronic device 150. Energy controller 110 can control the continuous, periodic, or sporadic charging or discharging of energy storage 112. Examples of energy storage 112 include a capacitor, super-capacitor, polymer-based battery, lithium-ion or potassium-ion battery, or any other rechargeable energy storage technology known to one skilled in the art. Energy controller 110 can divert and regulate the voltage and/or amperage of the harvested energy to charge energy storage 112, and can draw power from energy storage 112 as needed to power electronic device 150.

In various embodiments and as shown in FIG. 1, energy harvester 120 can be electrically coupled to energy controller 110 and can convert one or more forms of energy from environmental or ambient sources into another form of energy, for example, electromagnetic radiation to electricity, mechanical (e.g., vibration, pressure, motion, etc.) to electricity, heat to electricity, magnetic field to electricity, chemical reaction to electricity, and the like. Examples of energy harvester 120 include photovoltaic cells, antennas/rectennas/nantennas, Hall effect transducers, coils/inductors, piezoelectric transducers, thermocouples/thermoelectric devices, micro turbines, and the like.

Energy harvester 120 can include one or more harvesters capable of harvesting energy from one environmental source or multiple harvesters capable of harvesting energy from one or more environmental sources. For example, energy harvester 120 can include a photovoltaic cell, an array of photovoltaic cells, a photovoltaic cell and a piezoelectric transducer, an array of photovoltaic cells and a piezoelectric transducer, and the like. In configurations where energy harvester 120 includes multiple harvesters, energy controller 110 can monitor the availability of energy being harvested by each harvester of energy harvester 120, condition the energy being harvested by each harvester, switch between or combine the energy being harvested by each harvester to power electronic device 150, and the like. Furthermore, in configurations where energy harvester 120 includes multiple types of harvesters each capable of harvesting energy from a different environmental source, energy controller 110 can monitor the availability of energy being harvested by each type of harvester, condition the energy being harvested by each type of harvester, switch between or combine the energy being harvested by each type of harvester to power electronic device 150, and the like.

In configurations consistent with various embodiments, energy harvester 120 can be an integral part of an outer surface or a cover of energy harvesting apparatus 100. For example, energy harvesting apparatus 100 can integrate one or more photovoltaic cells into its outer surface or use one or more photovoltaic cells as its outer surface. In further configurations consistent with various embodiments, energy harvesting apparatus 100 can include at least one dock or coupling mechanism for removably housing or coupling with energy harvester 120. Such a dock or coupling mechanism can be formed in or on an outer surface of energy harvesting apparatus 100 in the form of, for example, a slot, a bay, an opening, a cavity, a coupler, and the like. Furthermore, energy harvester 120 can perform one or more functions in addition to harvesting energy from environmental sources. For example, in configurations where energy harvester 120 includes a piezoelectric transducer, electronic device 150 can also use the piezoelectric transducer to provide an audible alarm. For another example, in configurations where energy harvester 120 includes an antenna for harvesting radio waves, electronic device 150 can also use the antenna to transmit an alarm over a wireless connection.

Electronic device 150 can be electrically coupled to energy controller 110, and can include multiple components and/or functionalities that can be independently switched on and off. Electronic device 150 can operate in different power modes, such as "on" or full-power mode, "fail-safe" mode in which select components or functionalities are powered, "standby" or low-power mode, "sleep" or minimal-power mode, "off" or no-power mode, and the like. Electronic device 150 can transition between any of the power modes, which can be controlled by energy controller 110 based on, for example, availability of harvested and other sources of energy, function(s) being performed by electronic device 150, power demands of electronic device 150, user selection, and the like. Energy controller 110 can place electronic device 150 or a component thereof in a low power mode (e.g., standby mode or sleep mode) to conserve energy and then bring electronic device 150 or the component thereof into a fully operational mode (e.g., on mode) when desired.

Electronic device 150 can include at least one detector or sensor that can monitor for and detect hazards or other abnormal conditions such as the presence of fire, smoke, intruders, or radiation, an insufficient or excessive concentration of one or more gases or airborne particles, insufficient or excessive moisture, extremes or fluctuations in temperature, excessive or a spike in noise or vibration, insufficient or excessive airflow, and the like. Electronic device 150 can also include at least one access control device such as a lock, a lockbox, or another electronically-operated access control device known to one skilled in the art.

According to various embodiments and as shown in FIG. 1, energy harvesting apparatus 100 can include at least one primary power source 130. Examples of primary energy source 130 include chemical batteries, fuel cells, generators, mains power, etc. Energy controller 110 can receive harvested energy from energy harvester 120 and use the harvested energy to supplement primary power source 130 in powering electronic device 150, charge energy storage 112 and/or primary power source 130, provide backup power when primary power source 130 fails, and the like.

In various embodiments, energy controller 110 can supervise or monitor a status or a primary power level of primary power source 130 to determine whether primary power source 130 has failed or is unavailable to power electronic device 150. For example, if primary power source 130 includes mains power, energy controller 110 can detect that the mains power has become unavailable. For another example, if primary power source 130 includes at least one chemical battery, energy controller 110 can detect that the chemical battery has been removed or that the chemical battery's power level has fallen below the critical threshold. If energy controller 110 determines that primary power source 130 has failed or is unavailable, then energy controller 110 can cause energy harvesting apparatus 100 to enter a fail-safe mode. In the fail-safe mode, energy harvesting apparatus 100 can use backup power on an emergency basis to power electronic device 150 or critical components or functions of electronic device 150. Backup power can include the harvested energy from energy harvester 120, energy stored in energy storage 112, or both. In the fail-safe mode, energy harvesting apparatus 100 can power all or only critical components or functions of electronic device 150, which can be selected based on a backup power level of the backup power. In the fail-safe mode, energy harvesting apparatus 100 can also provide an indication (not shown) that primary power source 130 has failed.

Figure 2:
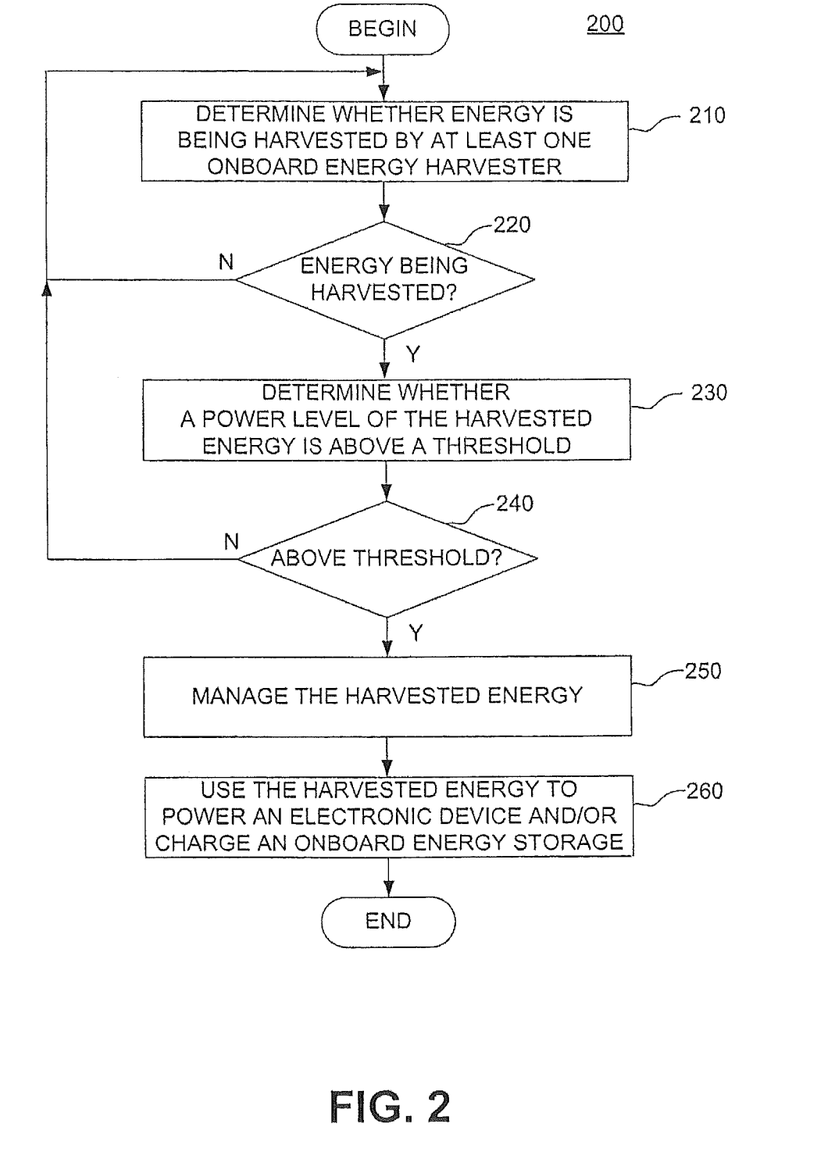
FIG. 2 is a process flow diagram showing the steps performed by the energy harvesting apparatus to manage and utilize energy harvested from environmental sources, according to various embodiments of the present teachings.
Figure 3:
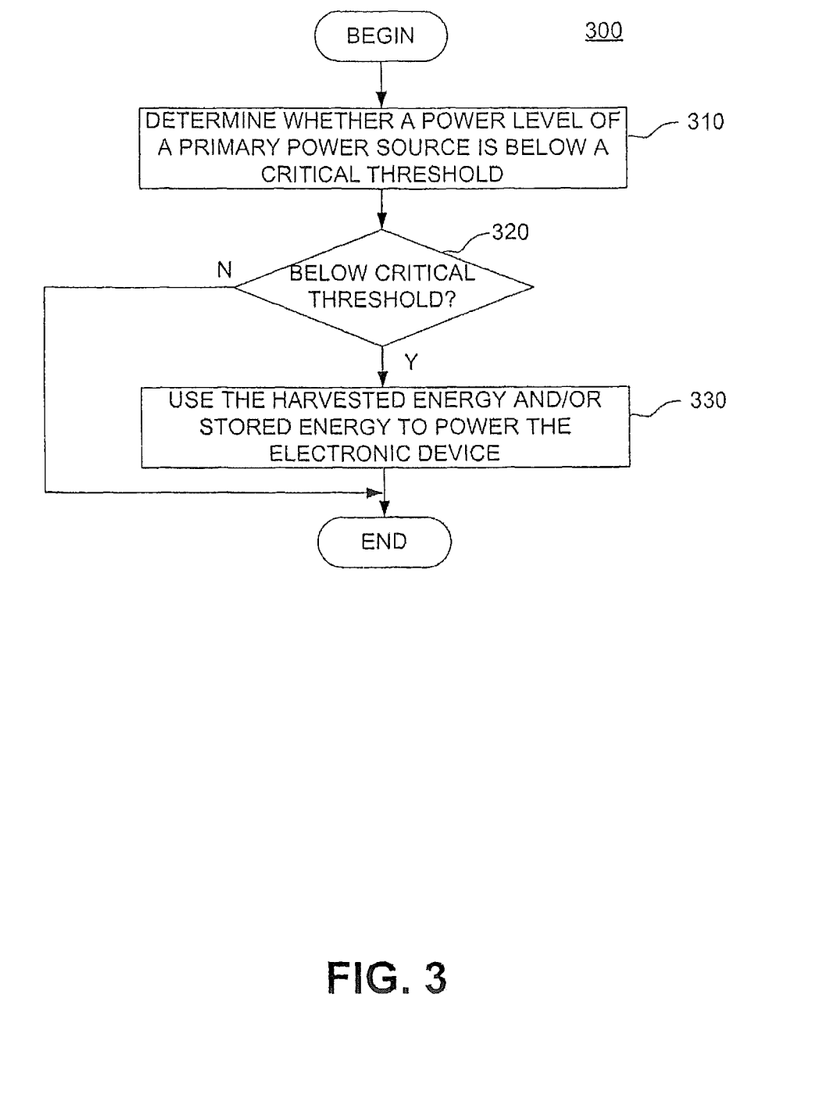
FIG. 3 is a process flow diagram showing the steps performed by the energy harvesting apparatus to supervise a primary power source and utilize backup power on an emergency basis when the primary power source fails, according to various embodiments of the present teachings.

FIGS. 2 and 3 illustrate methodologies and/or flow diagrams of processing 200 and processing 300 performed by energy harvesting apparatus 100 to manage and utilize energy harvested from environmental sources. In various embodiments, one or more components of energy harvesting apparatus 100, such as energy controller 110, can perform processing 200, processing 300, or both. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

In various embodiments, energy harvesting apparatus 100 can perform processing 200, as shown in FIG. 2, to manage and utilize energy harvested by energy harvester 120. In 210, energy harvesting apparatus 100 can use energy controller 110 to determine whether or not energy harvester 120 is harvesting or scavenging energy from one or more environmental sources. Energy harvesting apparatus 100 can monitor energy harvester 120 to determine the availability of harvested energy. In configurations where energy harvester 120 includes multiple harvesters, energy harvesting apparatus 100 can monitor the availability of energy being harvested by each, some, or all of the harvesters of energy harvester 120. In configurations where energy harvester 120 includes multiple types of harvesters capable of harvesting energy from multiple environmental sources, energy harvesting apparatus 100 can monitor the availability of energy being harvested by each type or some or all types of harvesters. Next, in 220, if energy harvesting apparatus 100 has determined that energy harvester 120 is not harvesting energy, then processing 200 can either return to 210 or terminate. Alternatively, if energy harvesting apparatus 100 has determined that energy harvester 120 is harvesting energy, then processing 200 can proceed to 230.

In 230, energy harvesting apparatus 100 can determine whether or not a power level (e.g., voltage, amperage, and/or wattage) of the energy harvested by energy harvester 120 is above a threshold. In configurations where energy harvester 120 includes multiple harvesters, energy harvesting apparatus 100 can monitor the power level of energy being harvested by each, some, or all of the harvesters of energy harvester 120. In configurations where energy harvester 120 includes multiple types of harvesters capable of harvesting energy from multiple environmental sources, energy harvesting apparatus 100 can monitor the power level of energy being harvested by each type or some or all types of harvesters. Next, in 240, if energy harvesting apparatus 100 has determined that the power level of the harvested energy is not above the threshold, then processing 200 can either return to 210 or terminate. Alternatively, if energy harvesting apparatus 100 has determined that the power level of harvested energy is above the threshold, then processing 200 can proceed to 250.

In 250, energy harvesting apparatus 100 can manage the harvested energy by conditioning the harvested energy for powering electronic device 150. Energy harvesting apparatus 100 can condition the harvested energy by rectifying, smoothing, stepping up, and/or stepping down the voltage of the harvested energy. Energy harvesting apparatus can also manage the harvested energy by combining the harvested energy with energy from one or more other sources, such as primary power source 130 as shown in FIG. 1, for powering electronic device 150. In configurations where energy harvester 120 includes multiple harvesters, energy harvesting apparatus 100 can combine the energy harvested by some or all of the harvesters. In configurations where energy harvester 120 includes multiple types of harvesters, energy harvesting apparatus 100 can combine the energy harvested by some or all types of the harvesters. Energy controller 110 can further manage harvested energy by switching between the harvested energy and energy from another source, such as primary power source 130, to power electronic device 150 based on the availability of the harvested energy and power demands of electronic device 150. Finally, in 260, energy harvesting apparatus 100 can use the harvested energy to power electronic device 150 and/or charge onboard energy storage 112, and then processing 200 can terminate.

In various embodiments, energy harvesting apparatus 100 can perform processing 300, as shown in FIG. 3, to supervise primary power source 130 and utilize backup power on an emergency basis, such as when power from primary power source 130 has become insufficient or unavailable. In 310, energy harvesting apparatus 100 can use energy controller 110 to monitor a primary power level of primary power source 130 and determine whether or not the primary power level is below a critical threshold. Next, in 320, if energy harvesting apparatus 100 has determined that the primary power level is not below the critical threshold, then processing 300 can terminate. Alternatively, if energy harvesting apparatus 100 has determined that the primary power level is below the critical threshold, then processing 300 can proceed to 330.

In 330, energy harvesting apparatus 100 can enter a fail-safe mode and rely solely on backup power, on an emergency basis, to power electronic device 150 or critical components or functions of electronic device 150. Backup power can include energy being harvested by energy harvester 120, energy stored in energy storage 112, or both. In the fail-safe mode, energy harvesting apparatus 100 can power all components/functions or only critical components/functions of electronic device 150, which can be selected based on a level of the backup power available to power electronic device 150. For example, energy harvesting apparatus 100 can determine the backup power level and provide the backup power to some or all components/functions of electronic device 150 based on the backup power level.

In configurations where energy harvester 120 includes multiple harvesters, energy harvesting apparatus 100 can monitor the power level of energy being harvested by each, some, or all of the harvesters of energy harvester 120. In configurations where energy harvester 120 includes multiple types of harvesters capable of harvesting energy from multiple environmental sources, energy harvesting apparatus 100 can monitor the power level of energy being harvested by each type or some or all types of harvesters. Energy harvesting apparatus 100 can remain in the fail-safe mode and use the backup power to power electronic device 150, as long as the primary power level of primary power source 130 remains below the critical threshold and the backup power remains available. Finally, subsequent to 330, processing 300 can terminate.

The foregoing description is illustrative, and variations in configuration and implementation may occur to persons skilled in the art. For instance, the various illustrative logics, logical blocks, modules, and circuits described in connection with the embodiments disclosed herein can be implemented or performed with a general purpose processor, a digital signal processor ("DSP"), an application specific integrated circuit, a field programmable gate array or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described herein can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Resources described as singular or integrated can in one embodiment be plural or distributed, and resources described as multiple or distributed can in embodiments be combined.

The scope of the present teachings is accordingly intended to be limited only by the following claims, and modifications and equivalents may be made to the features of the claims without departing from the scope of the present teachings.

What is claimed is:

1. An apparatus for managing energy harvested from one or more environmental sources, comprising:
   at least one energy harvester onboard the apparatus for converting energy from the one or more environmental sources into harvested energy;
   a primary power source;

an energy controller onboard the apparatus and connected to the primary power source and the at least one energy harvester;

an electronic device onboard the apparatus, wherein the energy controller uses the harvested energy to power the electronic device; and an onboard energy storage;

wherein the electronic device includes at least one of a hazard detector or an access control device;

wherein the energy controller determines that a power level of the harvested energy is above a threshold and charges the onboard energy storage using the harvested energy when the power level of the harvested energy is above the threshold.

2. The apparatus of claim 1, wherein the energy controller determines that a primary power level of the primary power source has fallen below a critical threshold; and the energy controller powers the electronic device using the harvested energy.

3. The apparatus of claim 2, wherein the electronic device includes a plurality of components; and the energy controller selects one or more components of the plurality of components and powers the one or more components using the harvested energy.

4. The apparatus of claim 1, wherein the energy controller determines that a primary power level of the primary power source has fallen below a critical threshold; and the energy controller draws stored energy from the onboard energy storage and powers the electronic device using the stored energy.

5. The apparatus of claim 4, wherein the electronic device includes a plurality of components; and the energy controller selects one or more components of the plurality of components and powers the one or more components using the stored energy.

6. The apparatus of claim 1, wherein the energy controller determines that a power level of the harvested energy is below a threshold and draws energy from the primary power source to power the electronic device.

7. The apparatus of claim 6, wherein the energy controller combines the energy drawn from the primary power source with the harvested energy to power the electronic device.

8. The apparatus of claim 1, wherein the primary power source includes at least one of a battery, mains power, a fuel cell, or a generator.

9. The apparatus of claim 1, wherein the at least one energy harvester includes a plurality of types of energy harvester for converting energy from a plurality of environmental sources into the harvested energy; and the energy controller combines the harvested energy drawn from the plurality of types of energy harvester to power the electronic device.

10. The apparatus of claim 1, wherein the one or more environmental sources includes at least one of electromagnetic radiation, magnetic field, radiation, vibration, mechanical movement, biomechanical movement, heat, chemical reaction, pressure, or airflow.

11. The apparatus of claim 1, wherein the at least one energy harvester is removably connected to the apparatus.

12. An apparatus for managing energy harvested from one or more environmental sources, comprising:

at least one energy harvester onboard the apparatus for converting energy from the one or more environmental sources into harvested energy;

a primary power source:

an energy controller onboard the apparatus and connected to the primary power source and the at least one energy harvester; and an electronic device onboard the apparatus, wherein the energy controller uses the harvested energy to power the electronic device, wherein the electronic device includes at least one of a hazard detector or an access control device;

wherein the energy controller determines that a primary power level of the primary power source has fallen below a critical threshold and the energy v controller powers the electronic device using the harvested energy;

wherein the electronic device includes a plurality of components; and the energy controller monitors a power level of the harvested energy, selects one or more components of the plurality of components based on the power level of the harvested energy, and powers the one or more components using the harvested energy.

13. An apparatus for managing energy harvested from one or more environmental source. comprising:

at least one energy harvester onboard the apparatus for converting energy from the one or more environmental sources into harvested energy;

a primary power source;

an energy controller onboard the apparatus and connected to primary power source and the at least one energy harvester;

an electronic device onboard the apparatus, wherein the energy controller uses the harvested energy to power the electronic device, and an onboard energy storage, wherein the electronic device includes at least one of a hazard detector or an access control device:

wherein the energy controller determines that a power level of the harvested energy is above a threshold and charges the onboard energy storage using the harvested energy, wherein the energy controller determines that a primary power level of the primary power source has fallen below a critical threshold; and the energy controller draws stored energy from the onboard energy storage and powers the electronic device using the stored energy;

wherein the electronic device includes a plurality of components; and the energy controller monitors a power level of the stored energy, selects one or more components of the plurality of components based on the power level of the stored energy, and powers the one or more components using the stored energy.

14. A method for managing energy harvested from one or more environmental sources by at least one energy harvester onboard an apparatus, comprising:

receiving harvested energy harvested by the at least one energy harvester;

determining whether a power level of a primary power source is below a critical threshold, wherein the primary power source is different from the at least one energy harvester;

subsequent to determining that the power level of the primary power source is below the critical threshold, powering an electronic device onboard the apparatus using only the harvested energy;

subsequent to determining that the power level of the primary power source is not below the critical threshold, combining the harvested energy with energy drawn from the primary power source to power the electronic device; and charging an energy storage onboard the apparatus using the harvested energy, wherein the energy storage is different from the primary power source, wherein charging the energy storage onboard the apparatus comprises determining that a power level of the harvested energy is above a threshold and charging the onboard energy storage using the harvested energy when the power level of the harvested energy is above the threshold;

wherein the electronic device includes at least one of a hazard detector or an access control device.

15. The method of claim 14, wherein the electronic device includes a plurality of components, and wherein the method further comprises:

selecting one or more components of the plurality of components; and providing power to the one or more components using the harvested energy.

16. The method of claim 14, wherein the at least one energy harvester includes a plurality of types of energy harvester for converting energy from a plurality of environmental sources into the harvested energy, the method further comprising:

combining the harvested energy drawn from the plurality of types of energy harvester to power the electronic device.

17. The method of claim 14, wherein the one or more environmental sources includes at least one of electromagnetic radiation, magnetic field, radiation, vibration, mechanical movement, biomechanical movement, heat, chemical reaction, pressure, or airflow.

18. A method for managing energy harvested from one or more environmental sources by at least one energy harvester onboard an apparatus, comprising:

receiving harvested energy harvested by the at least one energy harvester;

determining whether a power level of a primary power source is below a critical threshold, wherein the primary power source is different from the at least one energy harvester;

subsequent to determining that the power level of the primary power source is below the critical threshold, lowering an electronic device onboard the apparatus using only the harvested energy; and subsequent to determining that the power level of the primary power source is not below the critical threshold, combining the harvested energy with energy, drawn from the primary power source to power the electronic device, wherein the electronic device includes at least one of a hazard detector or an access control devices;

wherein the electronic device includes a plurality of components, and wherein the method further comprises:

monitoring a power level of the harvested energy;

selecting one or more components of the plurality of components based on the power level of the harvested energy; and providing power to the one or more components using the harvested energy.

\* \* \* \* \*